United States Patent [19]
Clarke

[11] Patent Number: 5,540,191
[45] Date of Patent: Jul. 30, 1996

[54] HIGH EFFICIENCY THERMAL REGENERATED INTERNAL COMBUSTION ENGINE

[75] Inventor: John M. Clarke, Chillicothe, Ill.

[73] Assignee: Caterpillar Inc., Peoria, Ill.

[21] Appl. No.: 354,350

[22] Filed: Dec. 12, 1994

[51] Int. Cl.$^6$ .................................................. F02B 47/00
[52] U.S. Cl. ...................... 123/25 C; 123/25 Q; 123/541
[58] Field of Search ............................. 123/25 C, 25 D, 123/25 Q, 543, 542

[56] References Cited

U.S. PATENT DOCUMENTS

| | | | |
|---|---|---|---|
| 4,122,803 | 10/1978 | Miller | 123/25 |
| 4,790,284 | 12/1988 | Ferrenberg et al. | 123/543 |
| 4,791,787 | 12/1988 | Paul et al. | 60/605.1 |
| 4,936,262 | 6/1990 | Paul et al. | 123/25 |
| 5,012,772 | 5/1991 | Nakamura | 123/25 C |
| 5,125,366 | 6/1992 | Hobbs | 123/25 C |
| 5,148,776 | 9/1992 | Connor | 123/25 |
| 5,237,964 | 8/1993 | Tomoin | 123/25 C |
| 5,394,838 | 3/1995 | Chandler | 123/25 C |

Primary Examiner—Henry C. Yuen
Assistant Examiner—Erick Solis
Attorney, Agent, or Firm—Diana L. Charlton

[57] ABSTRACT

A thermal regenerator used on an internal combustion engine normally absorbs heat from expanded hot combustion gases when moved in one direction and transfers the absorbed heat to the compressed intake air when moved through the air in an opposite direction. In order to improve efficiency of the thermal regenerator, finely dispersed cooling liquid is added into the intake air to cool the intake air to a lower temperature before the thermal regenerator transfers the absorbed heat. When compressing a mixture of finely dispersed cooling liquid in the intake air, the vaporization of the cooling liquid reduces compression work and the resultant temperature. The reduced compression temperature allows more heat to be extracted from the exhaust, raises the effectiveness of the regenerator and the efficiency of the engine.

10 Claims, 4 Drawing Sheets

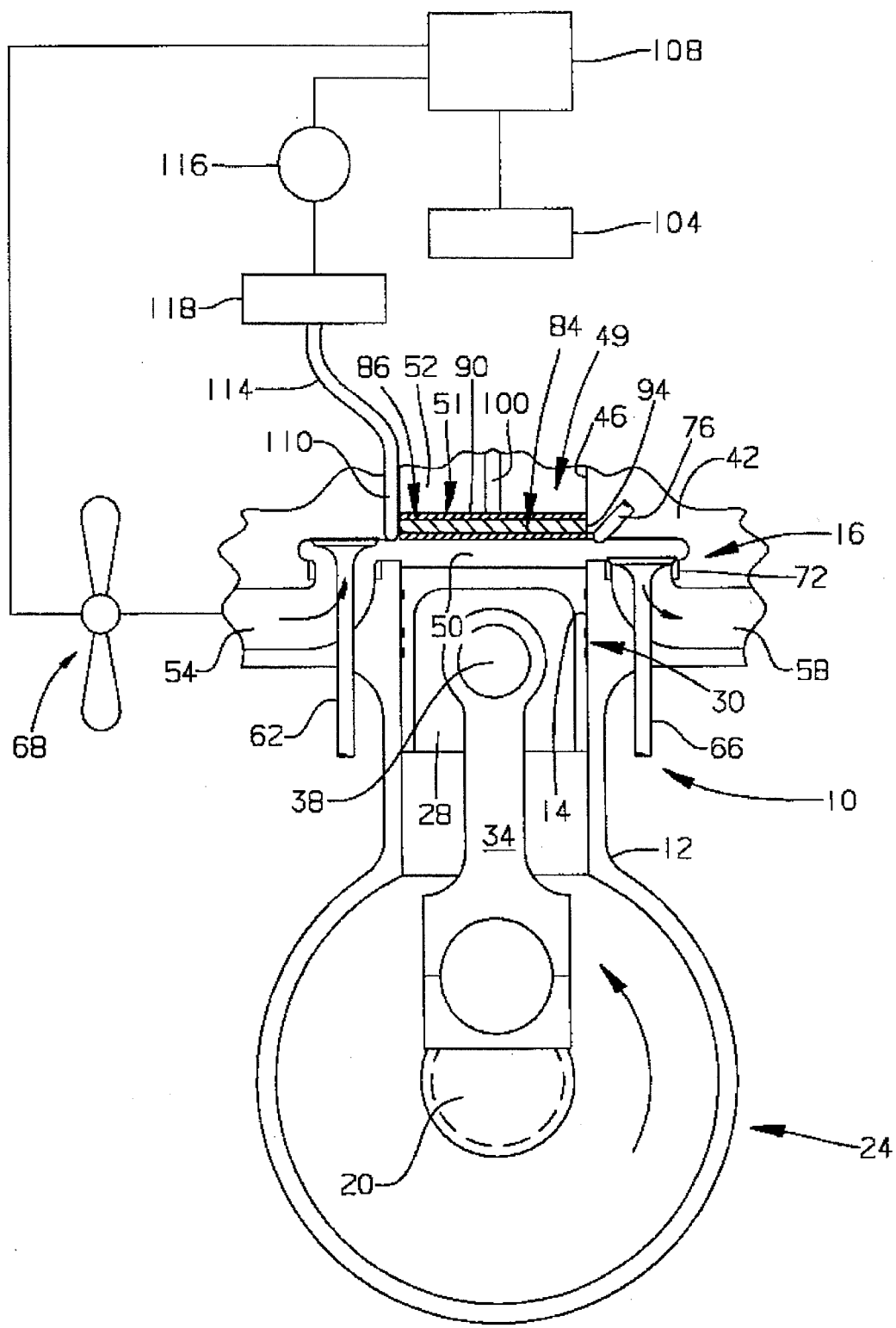

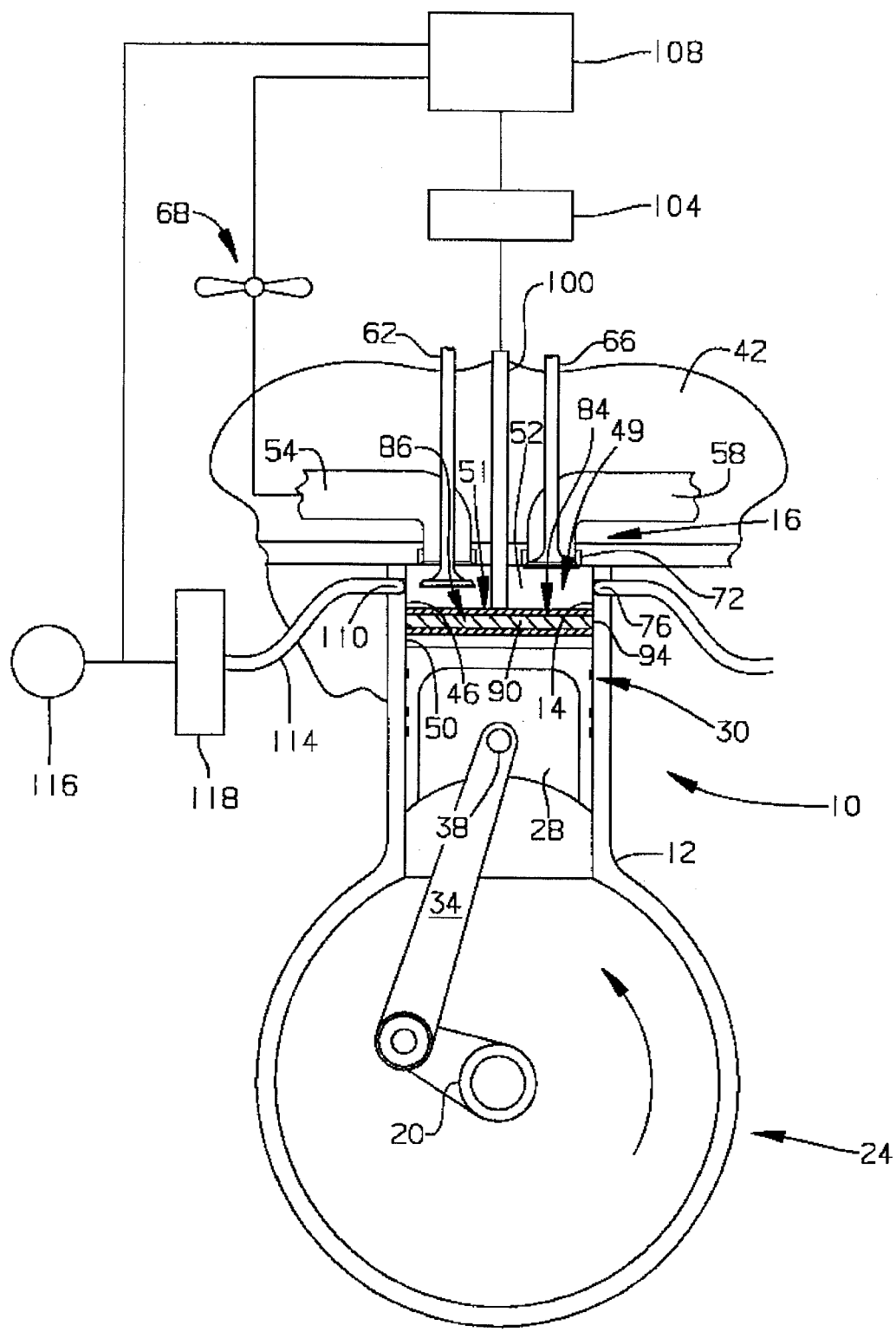
Fig_3_

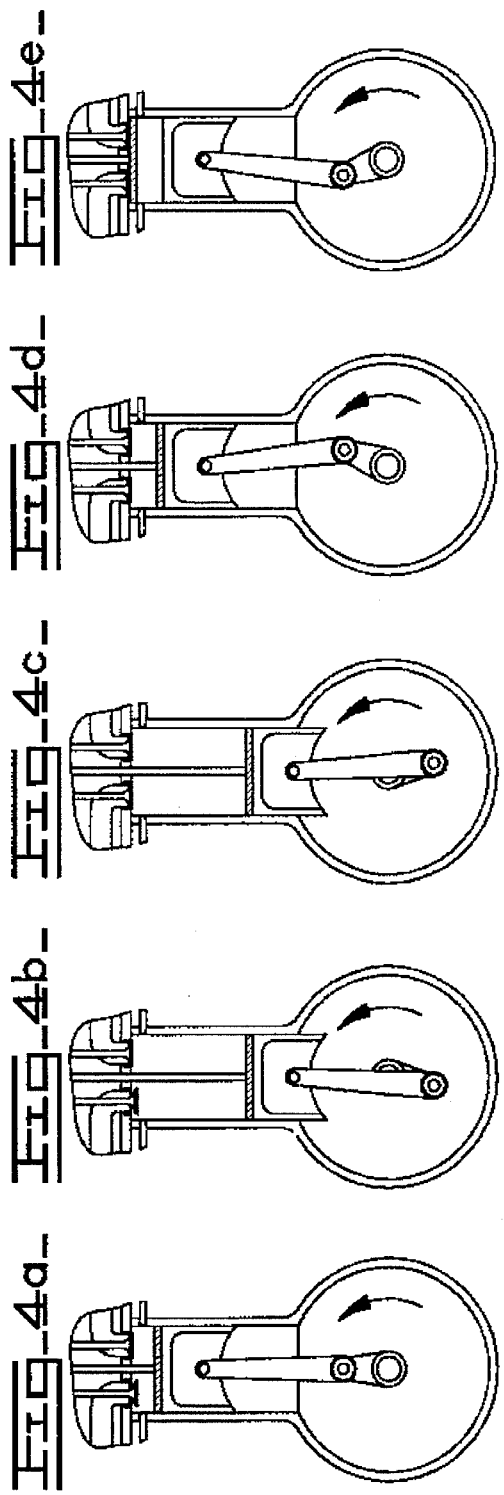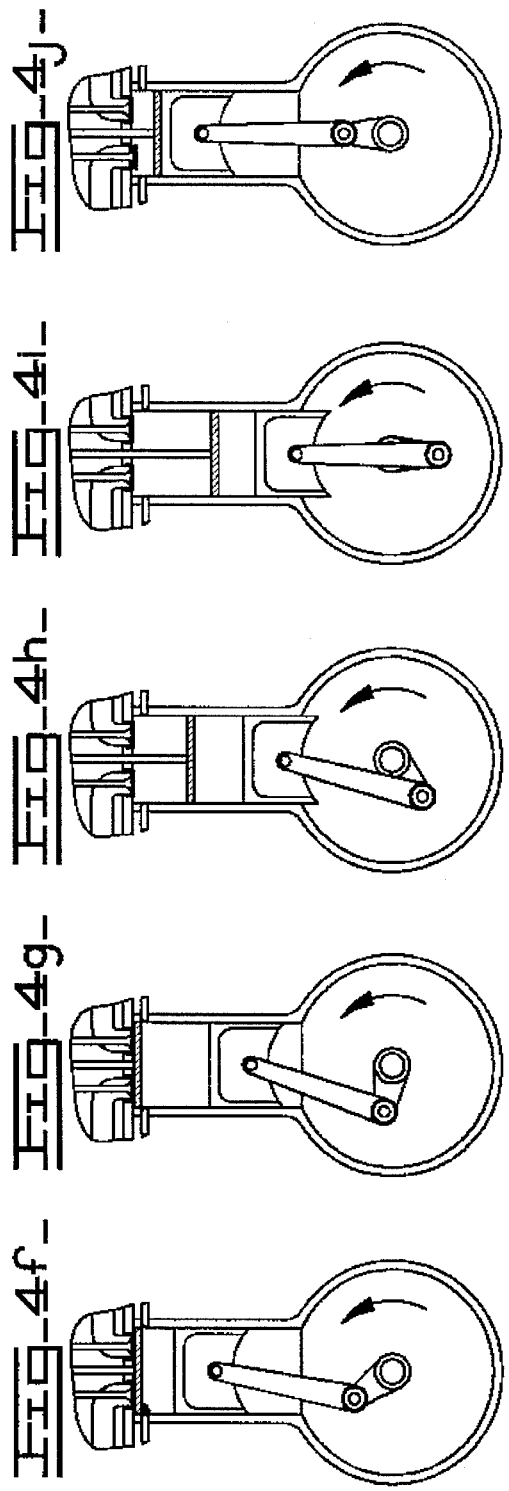

HIGH EFFICIENCY THERMAL REGENERATED INTERNAL COMBUSTION ENGINE

TECHNICAL FIELD

This invention relates generally to an in-cylinder thermal regenerator for an internal combustion engine and more particularly to the injection of cooling liquid within the cylinder to obtain increased thermal efficiency.

BACKGROUND ART

Thermal regeneration has been proposed for increasing the thermal efficiency of an internal combustion engine. Thermal regeneration consists of the introduction of a heat exchanger within the cylinder which has a core made from a material capable of withstanding nigh temperatures while exhibiting low thermal conductivity. During the exhaust cycle of the engine, the core absorbs the exhaust gas heat. The exhaust gas heat is then transferred from the core to the working fluid following the compression cycle, but prior to or during the combustion of fuel, in order to reduce the required quantity of fuel to be burned.

A regenerative internal combustion engine is disclosed in U.S. Pat. No. 4,790,284 issued to Allan J. Ferrenberg et. al. on Dec. 13, 1988 wherein a regenerator captures the unutilized heat normally expelled with the exhaust products of an engine and transfers it to the fresh working fluid at the appropriate time in the next engine operating cycle to reduce the quantity of fuel which must be burned such as that described above. This is accomplished through the use of a permeable, movable heat exchanger located between the piston and the cylinder head. However, the quantity of heat which can be recirculated in this way corresponds to the cooling from the temperature of the exhaust gas after expansion to the temperature of the compressed gas late in the compression process. Therefore, when the gas is compressed isentropically, its end-of-compression temperature is high which limits the efficacy of the regenerator in the disclosed patent.

The present invention is directed at overcoming the problems as set forth above.

DISCLOSURE OF THE INVENTION

In one aspect of the present invention, an internal combustion engine has a cylinder block with an annular open ended bore defined therein. A crankshaft is rotatably mounted within the cylinder block. A piston is operatively associated with the crankshaft and is mounted for reciprocation between a top dead center position at an uppermost location and a bottom dead center position at a lowermost location in the annular open ended bore. A head is mounted in closing relation to the annular open ended bore.

A thermal regenerator is positioned within the annular open ended bore and movable between the cylinder head and the piston. A regeneration chamber is defined within the annular open ended bore between one of the cylinder head and piston and the thermal regenerator at certain positions of the regenerator. A combustion chamber is defined within the annular open ended bore between the other of the cylinder head and piston at certain positions of the regenerator. An intake valve means is provided for admitting fresh air into the cold chamber. Exhaust valve means is provided for expelling exhaust gases from the chamber. Means for injecting fuel into the annular bore is provided for the combustion of the fuel in the combustion chamber. A source of cooling liquid is provided. An injection means is included for adding a preestablished quantity of cooling liquid into the cold or regeneration chamber during a predetermined operating cycle of the engine.

The present invention utilizes a thermal regenerator which absorbs heat from hot combustion gases when moved in one direction and transfers the absorbed heat to cool intake air when moved in an opposite direction. The addition of cooling liquid, preferably of a high latent heat of vaporization, into the intake air as disclosed herein cools the intake air to a lower temperature before the thermal regenerator transfers the absorbed heat. Therefore the quantity of heat exchanged by the regenerator is increased, the temperature of the exhaust is reduced and the effectiveness of the thermal regenerator is increased. Alternatively the cooling liquid may be used to reduce the temperatures required for combustion and the regenerator while maintaining very high engine efficiency.

BRIEF DESCRIPTION OF THE DRAWINGS

FIG. 1 is a schematic representation of one embodiment of a regenerative internal combustion engine;

FIG. 3 is a schematic representation of another embodiment of a regenerative internal combustion engine; and FIGS. 4, *a–j* are a schematic representation of the operational sequence of events in the four stroke cycle operation of the regenerative internal combustion engine of FIG. 3.

BEST MODE FOR CARRYING OUT THE INVENTION

Figure 2E:
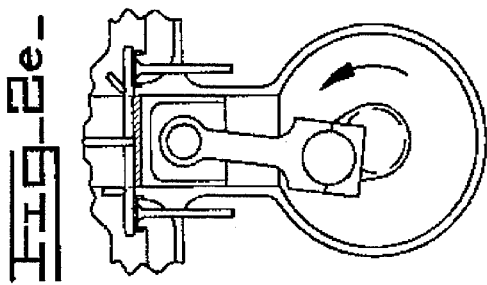
FIGS. 2, *a–j* are a schematic representation of the operational sequence of events in the four stroke cycle operation of the regenerative internal combustion engine of FIG. 1.
Figure 2J:
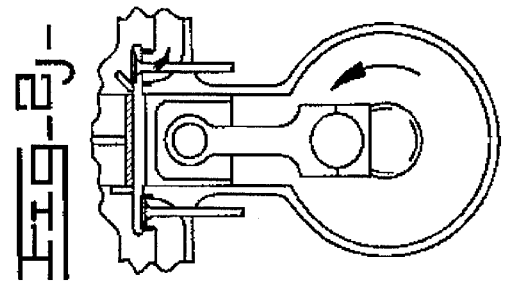

Referring now to the drawings and in particular FIGS. 1 and 2*a–j*, an internal combustion engine 10 includes a cylinder block 12 with an annular open ended bore 14 at an upper end 16. The invention disclosed herein may be used with either a two or four stroke engine. For convenience, a four stroke diesel-cycle engine is illustrated, but it will be readily appreciated that the invention will be applicable to other types and configurations of engines. A crankshaft 20 is rotatably mounted within the cylinder block 12 at a lowermost end 24. A piston 28 is mounted within the bore 14 and is sealed against the wall of the bore 14 by a plurality of piston rings 30. The piston 28 is connected to the crankshaft through any type of suitable means capable of providing reciprocating, linear movement, such as a conventional connecting rod 34 and piston pin 38 or any other linkage. The piston 28 reciprocates between a top dead center (TDC) position at an uppermost location and a bottom dead center (BDC) at a lowermost location in the bore 14. The reciprocation between the top dead center (TDC) position and the bottom dead center (BDC) position within the bore 14 defines the four-stroke cycle of the engine 10 including the intake, compression, power, and exhaust strokes.

A cylinder head 42 is mounted at the upper end 16 of the cylinder block 12 in closing relation to the bore 14. The cylinder head 42 has an annular open ended bore 46 therein coaxial with the bore 14 in the cylinder block 12. A chamber or engine cylinder 49 is formed within the bore 14 by and between the cylinder head 42 and the piston 28. A regenerator 51 (described in more detail below) is shown positioned in the engine cylinder 49 and movable to preselected positions in said cylinder 49. At certain positions of the regenerator, a combustion chamber 50 is defined between said regenerator and the head 42 in the annular bores 14 and 46. At certain positions of the regenerator, a cold chamber 52 is also defined between the piston 28 and said regenerator 51 in said cylinder 49.

An intake valve means and an exhaust valve means, shown as intake valve 62 and exhaust valve 66, respectively, are disposed within the cylinder block 12. Each valve 62,66 has an open and a closed position. An intake port 54 and an exhaust port 58 are defined within the cylinder block 12 and are in fluid communication with the cold chamber 52. Although a poppet type valve is shown, it should be understood that any suitable type of valve, such as a sleeve valve, slide valve, or rotary valve might be used. The intake valve 62 is operatively associated with the intake port 54 to admit ambient air into the cold chamber 52 during the intake stroke of the engine 10 when the intake valve 62 is in the open position. A means 68 for sensing the humidity of the intake air is positioned within the intake port 54. The sensing means 68 may be a conventional humidistat or any other suitable type of sensor. The exhaust valve 66 is operatively associated with the exhaust port 58 to expel exhaust gases from the engine cylinder 49, and more particularly the cold chamber 52, during the exhaust stroke when the exhaust valve 66 is in the open position. A valve seat 72 is shown within the intake port 54 and the exhaust port 58 for seating the intake valve 62 and exhaust valve 66 when the valves 62,66 are in the closed position thereby blocking communication between the ports 54,58 and the cold chamber 52. The intake and exhaust valves 62,66 are selectively moved to the open and closed positions by any suitable actuation means, such as a camshaft (not shown) or mechanical means, hydraulic means, pneumatic means, or electric means.

A conventional fuel injector 76 with an open and closed position is disposed within the head 42 at an angle sufficient to inject the appropriate quantity of fuel into the combustion chamber 50 at the desired time during the operating cycle of the engine 10.

The regenerator 51 is a permeable heat exchanger which consists of two components, a core 84 and an auxiliary supporting structure 86. The regenerator core 84 is made of a material having the capability to withstand high temperatures and is so constructed as to have low thermal conductivity in a direction parallel to the longitudinal axis of the bore 14. The auxiliary supporting structure 86 consists of a metal disk 90 and a cylindrical skirt 94 separating the core 84 from the wall of the bore 14. A regenerator actuating rod 100 is connected at an end to the metal disk 90 in any suitable manner and allows the regenerator to move in the engine cylinder 49. The actuation of the rod 100 can be accomplished by any suitable means 104, such as mechanical, hydraulic, pneumatic, or electric responsive to an output signal. The actuation of the rod 100 is controlled by any suitable means 108, such as an electronic or electric signal communicating with the actuating means 104. For additional detail on the thermal regenerator 51, refer to U.S. Pat. No. 4,790,284 issued to Allan J. Ferrenberg.

A cooling liquid injector 110 is positioned within the head 42 at an angle sufficient to inject cooling liquid, preferably water, into the cold chamber 52 between the piston 28 and the thermal regenerator 51. The injector 110 should be equipped with a nozzle (not shown) capable of finely dispersing the cooling liquid during injection. A cooling liquid line 114 is connected to the injector 110 at an end and to a source of cooling liquid 116 at an opposite end. A valve 118 of any suitable type is disposed within the cooling liquid line 114 and has an open position allowing communication of cooling liquid from the cooling liquid source 116 into the injector 110 and a closed position blocking communication of cooling liquid from the cooling liquid source 116 into the injector 110. The valve 118 is responsive to a signal from the control means 108 which is connected and responsive to the sensing means 68. The valve 118 moves to the open and closed position at a specific time and duration during the operating cycle of the engine. It should be understood that a separate control means could be used to control the timing of the injector 110. It should also be understood that the valve 118 may be disposed within the injector 110.

Another embodiment of the present invention is shown in FIGS. 3 and 4a–j. The same reference numerals of the first embodiment are used to designate similar elements of this embodiment.

Referring now to FIGS. 3 and 4a–j, the combustion chamber 50 is formed within the bore 14 or engine cylinder 49 between the regenerator 51 and the piston 28. The intake port 54 and the exhaust port 58 are formed within the cylinder head 42 in communication with the cold chamber 52 located between the cylinder head 42 and the regenerator 80. The intake valve 62 and the exhaust valve 66 are disposed within the cylinder head 42. The fuel injector 76 and the cooling liquid injector 110 are disposed within the cylinder block 12.

It should be recognized that although the present invention is described in connection with a conventional four-cycle internal combustion engine, other engine configurations and variations may be used.

INDUSTRIAL APPLICABILITY

Figure 2D:
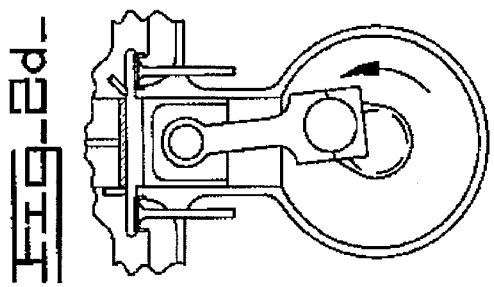
Figure 2I:
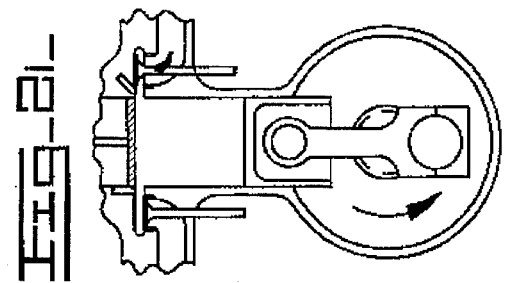
Figure 2C:
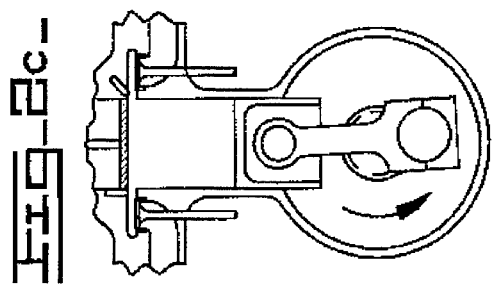
Figure 2H:
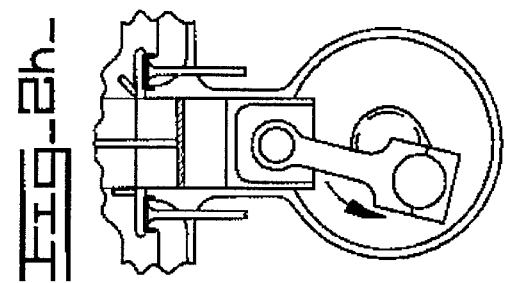
Figure 2B:
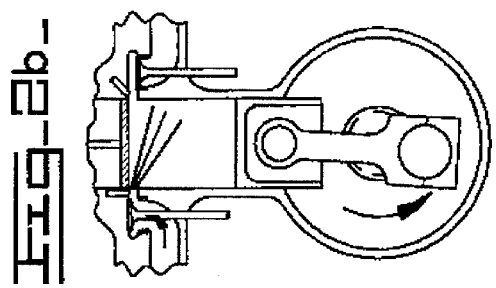
Figure 2G:
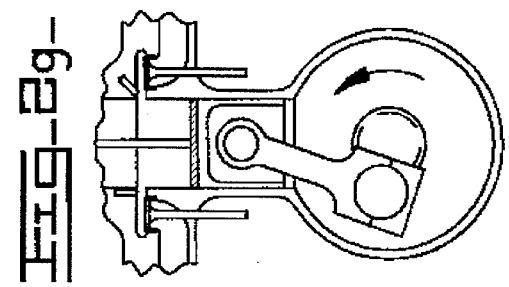
Figure 2A:
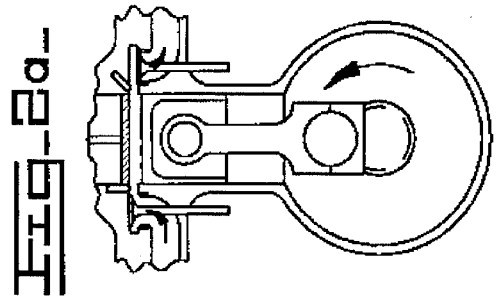

In use on the internal combustion engine 10 and referring more specifically to FIGS. 2a–2j, the four stroke cycle operation of the engine 10 is depicted. FIGS. 2a–2j shows the various piston 28, regenerator 51, and valve positions 62,66 at various times or crankshaft 20 angles during the cycle. The design of FIGS. 2a–2j is such that the high temperature volume, where the combustion occurs, is located between the regenerator 51 and the cylinder head 42, and is referred to as a cold piston engine design. The first step (FIG. 2a) consists of opening the intake valve 62 while the piston 28 is near the top dead center position (TDC), with the exhaust valve 66 closed, and the regenerator 51 positioned as close as possible to the surface of cylinder head 42 defining the engine cylinder 49. The intake stroke is accomplished by moving the piston 28 to near the bottom dead center position (BDC) while the regenerator 51 remains in place (FIGS. 2a–2b). The downstroke of the piston 38 draws fresh air through the intake valve 62 and into the volume between the piston 28 and the regenerator 51. The humidity level of the fresh air is monitored by the sensing means 68 which sends a signal to the controlling means 108. Next, the intake valve 62 is closed (FIG. 2c), and the piston 28 is moved upward compressing the air (FIGS. 2c–2d).

During the intake stroke (FIG. 2b), the controlling means 108 sends a signal to the valve 118 to open allowing cooling liquid to enter the cold chamber 52 now defined between the piston 28 and the regenerator 51 through the nozzle (not shown) in the injector 110. It should be understood that the controlling means 108 may send the signal to the valve 118 during the compression stroke without changing the scope of the invention. The cooling liquid should be injected into the cold chamber 52 in a fine dispersion which may be further dispersed by the intake of fresh air. The injection of the finely dispersed cooling liquid into the cold chamber 52 lowers the temperature and increases the density of the intake air, thereby allowing a greater volume of fresh air into the volume between the piston 28 and the cylinder head 42. When compressing a mixture of finely dispersed cooling liquid in the fresh air, the vaporization of the finely dispersed cooling liquid reduces the compression work and the resultant temperature after compression. The signal from the controlling means will control the timing of the opening of the valve 118 and the duration of the opening. The duration of the valve 118 opening depends upon the humidity level sensed within the intake port 54. When the piston 28 is at or near the top dead center position (TDC), the vaporization of the liquid is complete and the regenerator 51 is moved downward (FIGS. 2d–2e) to a position very close to the piston 28. The lower temperature compressed air enters the lower, cooler surface of the regenerator 51 and is heated as it progresses through the regenerator 51 (the regenerator 51 having been earlier heated as described below). The heat transfer between the lower temperature compressed air and the regenerator 51 is greater than the heat transfer in a conventional regenerator system, increasing the effectiveness of the regenerator 51.

Figure 2F:
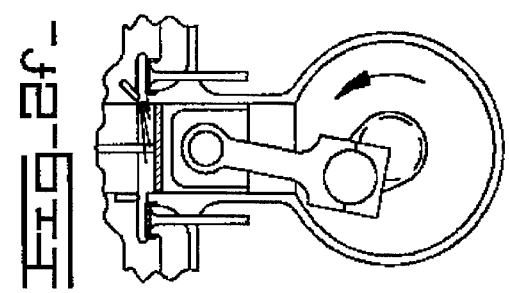

The compressed air emerges from the hot upper surface of the regenerator 51 into the now defined combustion chamber 50 at a higher temperature. Fuel is then injected into the heated air in the combustion chamber 50 and is burned to add heat to the working fluid (FIG. 2f). The high pressure working fluid pushes the piston 28 downward to at or neat its bottom dead center position (BDC), while the regenerator 51 is moved to follow the piston 28 as close as possible (FIGS. 2f–2g). Once the piston 28 reaches the bottom dead center position (BDC), the regenerator 51 reverses and is moved upward (FIGS. 2h–2i) through the expanded combustion products so as to extract the unutilized high temperature heat remaining in the gas. The exhaust stroke (FIGS. 2i–2j) is performed by opening the exhaust valve 66, at any time after the regenerator 51 has passed by and is above the exhaust port, and moving the piston 28 to its top dead center position (TDC). The rising piston 28 forces the spent, cooled combustion products out through the exhaust valve 66. The exhaust valve 66 is now closed, the intake valve 62 is opened, and the next cycle of operation begins.

Operating the engine 10 of FIG. 1 in a two stroke cycle is similar to the four stroke cycle described above. However, the intake and exhaust processes occur nearly simultaneously, near or after the completion of the power stroke. As the piston 28 approaches bottom dead center position (BDC), the regenerator 51 rises to the cylinder head 42. The exhaust valve 66 opens, discharging the pressurized combustion products, which travel from the cold chamber 52 between the regenerator 51 and the piston 28 and escape out the exhaust valve 66. As soon as the pressure has dropped sufficiently the intake valve 62 is opened. Scavenging now occurs with both valves 62,66 open and fresh air entering to displace exhaust gas. Both valves 62,66 subsequently close early in the compression stroke. During this portion of the cycle, the controlling means 108 sends a signal to the valve 118 to open allowing cooling liquid to enter the cold chamber 52 through the nozzle (not shown) in the injector 110. It should be understood, as mentioned above, that the controlling means 108 may send the signal to the valve 118 during a portion of the compression stroke without changing the scope of the invention.

Referring more specifically to FIGS. 4a–4j, the four stroke operating cycle of the engine 10 illustrating a second embodiment of the invention is depicted. The primary difference between the design of FIGS. 2a–2j and the design of FIGS. 4a–4j is that the high temperature volume, where the combustion occurs, is located between the regenerator 51 and the piston 28, rather than the regenerator 51 and the cylinder head 42. This is referred to as a hot piston engine design. The first step (FIG. 4a) consists of opening the intake valve 62 while the piston 28 is near the top of its stroke, with the exhaust valve 66 closed, and with the regenerator 51 positioned as closely as possible to the top of the piston 28. The piston 28 and regenerator 51, moving together, are now moved to the bottom of the stroke (FIGS. 4a–4b). The downward motion of the piston 28 draws fresh air into the cold chamber 52 through the intake valve 62. The intake valve 62 is now closed (FIG. 4c), and the piston. 28 and regenerator 51 are moved upward (FIGS. 4c–4d) together to the top of the stroke, compressing the air into the volume at the top of the combustion chamber 50. During the intake stroke (FIG. 4b), the controlling means 108 sends a signal to the valve 118 to open allowing cooling liquid to enter the cold chamber 52 through the nozzle (not shown) in the injector 110 as is described above in more detail in the first embodiment (FIGS. 2a–2j). As the piston 28 approaches the top of the stroke, the regenerator 51 is separated from the piston 28 and moved to the top of the cylinder 49 (FIGS. 4d–4e). As the regenerator 51 moves upward, the lower temperature compressed air enters: its cooler upper surface and is forced to pass through the regenerator core 84, and in so doing, is heated by the regenerator 51. Fuel is now injected from the fuel inspector 76 into the now defined combustion chamber 50 between the top of the piston 28 and the bottom of the regenerator 51 (FIG. 4f), and is ignited by the high temperature of the air. The hot, high pressure working fluid pushes the piston 28 to the bottom of its stroke, while the regenerator 51 is caused to remain at rest near the top of the cylinder 49 (FIGS. 4f–4g). During the downward motion of the piston 28, the hot working fluid expands and converts part of the heat contained in the working fluid into work. As the expansion stroke nears completion (FIG. 4g), the regenerator 51 is moved from its position near the top of the cylinder 49 down toward the piston 28, passing through the expanded working fluid, and absorbing the unutilized high temperature heat which it contains (FIG. 4h). As the working fluid is cooled by its passage through the regenerator 51, the pressure in the cylinder is reduced. As the regenerator 51 is moved downward, the exhaust valve 66 is opened (FIG. 4i). The piston 28 and the regenerator 51 meet and then move upward together, expelling the spent, cooled, working fluid through the exhaust valve 66 (FIGS. 4i–4j). The exhaust valve 66 now closes, the intake valve 62 opens, and the next cycle begins (FIG. 4a).

Two stroke cycle operation of the engine 10 of FIG. 3 is similar to the four stroke cycle described above. The two stroke cycle operation begins with the compression stroke. The piston 28 and regenerator 51 are positioned closely together and are at or near the bottom dead center position (BDC). Both the intake and exhaust valve 62,66 are closed. The piston 28 and regenerator 51 are moved upward together, compressing the air into the top part of the cylinder bore 49. At or near the end of the compression stroke, the regenerator 51 separates from the piston 28 and moves upward through the compressed air to the top of the cylinder 49, heating the air to a high temperature. The injector then injects fuel into the heated air between the piston 28 and the regenerator 51. The fuel is ignited by the high temperature of the air, by the hot bottom surface of the regenerator 80, and by burning, adds heat to the working fluid. The fuel could also be injected and burned during the expansion stroke. The hot, working fluid pushes the piston 28 downward, and during its expansion converts some of the heat into work. The regenerator 51 stays near the top of the cylinder 49 during most of the expansion stroke. At some point during the expansion stroke, the regenerator 51 starts to move downward, and shortly thereafter, the exhaust valve 66 opens. Since most of the working fluid is still at a high temperature, the pressure in the cylinder 49 is higher than atmospheric, and the working fluid flows through the regenerator 51 and out the exhaust valve 66. The working fluid gives up its unutilized high temperature heat while passing through the regenerator 51. As soon as the pressure in the cylinder 49 has fallen sufficiently the intake valve 62 opens. Scavenging now occurs with both valves 62,66 open and fresh air entering to displace exhaust gas. Both valves 62,66 subsequently close early in the compression stroke. During this portion of the cycle, the controlling means 108 sends a signal to the valve 118 to open allowing cooling liquid to enter the cold chamber 52 between the regenerator 51 and the cylinder head 42 through the nozzle (not shown) in the injector 110. It should be understood, as mentioned above, that the controlling means 108 may send the signal to the valve 118 during a portion of the compression stroke without changing the scope of the invention. When the regenerator 51 closely approaches the piston 28, and the pressure approaches atmospheric, the intake valve 62 closes, and the next cycle begins.

In view of the above, the addition of cooling liquid into the intake air cools the intake air to a lower temperature allowing a thermal regenerator to transfer its absorbed heat to the intake air at a greater capacity. Therefore the quantity of heat exchanged by the regenerator is increased, the temperature of the exhaust is reduced and the effectiveness of the thermal regenerator is increased. Alternatively the cooling liquid may be used to reduce the temperatures required for combustion and the regenerator while maintaining very high engine efficiency.

Other modifications and embodiments may be practiced without departing from the spirit of the invention.

I claim:

1. In an internal combustion engine having a cylinder block with an annular open ended bore defined therein, a crankshaft rotatably mounted within the cylinder block, a piston operatively associated with the crankshaft and mounted for reciprocation between a top dead center position at an uppermost location and a bottom dead center position at a lowermost location in the annular open ended bore, a head mounted in closing relation to the annular open ended bore, a thermal regenerator positioned within the annular open ended bore and movable to preselected positions between the piston and the head, the regenerator at certain positions in the annular bore defining with one of said piston and head a combustion chamber and defining with the other of said piston and head a cold chamber, intake valve means for selectively admitting intake air into the cold chamber, exhaust valve means for selectively expelling exhaust gases from the annular open ended bore between the piston and head, means for injecting fuel into the annular bore for the combustion of the fuel in the combustion chamber, the improvement comprising:

a source of cooling liquid; and injection means for adding a preestablished quantity of the cooling liquid into the cold chamber during a predetermined operating cycle of the engine.

2. The improvement of claim 1, wherein the injection means has an open and closed position with a preestablished timing.

3. The improvement of claim 1, further comprising means for sensing the humidity of the intake air.

4. The improvement of claim 3, wherein the sensing means is operatively associated with the timing of the injection means for regulating the quantity of cooling fluid injected into the cold chamber.

5. The improvement of claim 1, wherein the cooling liquid has a high latent heat of vaporization.

6. The improvement of claim 1, wherein the cooling liquid is water.

7. The improvement of claim 1, wherein the predetermined operating cycle is the intake stroke.

8. The improvement of claim 1, wherein the predetermined operating cycle is the compression stroke.

9. The improvement of claim 1, wherein the combustion chamber is defined between the piston and regenerator and the cold chamber is defined between the head and regenerator.

10. The improvement of claim 1, wherein the combustion chamber is defined between the head and regenerator and the cold chamber is defined between the piston and regenerator.

* * * * *